(12) United States Patent
Eguchi

(10) Patent No.: US 9,014,506 B2
(45) Date of Patent: Apr. 21, 2015

(54) IMAGE PROCESSING METHOD, PROGRAM, IMAGE PROCESSING APPARATUS, IMAGE-PICKUP OPTICAL APPARATUS, AND NETWORK DEVICE

(71) Applicant: Canon Kabushiki Kaisha, Tokyo (JP)

(72) Inventor: Akira Eguchi, Tucson, AZ (US)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 14/070,684

(22) Filed: Nov. 4, 2013

(65) Prior Publication Data

US 2014/0126806 A1     May 8, 2014

(30) Foreign Application Priority Data

Nov. 7, 2012  (JP) ................................. 2012-245701

(51) Int. Cl.
| | | |
|---|---|---|
| *G06K 9/40* | (2006.01) | |
| *G06T 5/00* | (2006.01) | |
| *G06T 5/10* | (2006.01) | |
| *G02B 21/36* | (2006.01) | |
| *H04N 5/217* | (2011.01) | |

(52) U.S. Cl.
CPC . *G06T 5/002* (2013.01); *G06T 5/10* (2013.01); *G02B 21/367* (2013.01); *G06T 2207/20052* (2013.01); *G06T 2207/20056* (2013.01); *H04N 5/217* (2013.01)

(58) Field of Classification Search
None
See application file for complete search history.

(56) References Cited

U.S. PATENT DOCUMENTS

| | | | |
|---|---|---|---|
| 6,525,875 B1 * | 2/2003 | Lauer ............................. | 359/371 |
| 2004/0213464 A1 * | 10/2004 | Hanson et al. ................ | 382/214 |
| 2007/0046540 A1 * | 3/2007 | Taenzer ........................ | 342/442 |
| 2008/0018901 A1 * | 1/2008 | Groot ............................ | 356/450 |
| 2008/0095358 A1 * | 4/2008 | Eguchi et al. .................. | 380/28 |

FOREIGN PATENT DOCUMENTS

| | | |
|---|---|---|
| JP | 10-304361 A | 11/1998 |
| JP | 2007-274064 A | 10/2007 |

OTHER PUBLICATIONS

Sibarita, J.-B., "Deconvolution Microscopy," in "Microscopy Techniques," Adv. Biochem Engin/Biotechnol (2005) 95: 201-243, Jens Rietdorf Ed., U.S. Springer.

Gu, Min, Principles of Three-Dimensional Imaging in Confocal Microscopes, pp. 47-97, 122-149, 310-323, U.S., World Scientific, 1996.

* cited by examiner

*Primary Examiner* — Randolph I Chu
(74) *Attorney, Agent, or Firm* — Rossi, Kimms & McDowell LLP

(57) ABSTRACT

An image processing method is configured to denoise three-dimensional image data. The image processing method includes an image transform step of performing a frequency transform for the three-dimensional image data in the optical axis direction and of calculating three-dimensional transformed image data, an image modulation step of reducing an absolute value of the three-dimensional transformed image data in a specific frequency region and of calculating three-dimensional modulated image data, and an inverse image transform step of performing an inverse frequency transform corresponding to the frequency transform for the three-dimensional modulated image data in the optical axis direction and of calculating three-dimensional inversely transformed image data. The specific frequency region is a part of a predetermined.

25 Claims, 12 Drawing Sheets

Pursuing Ben Drakart's Patent.

IMAGE PROCESSING METHOD, PROGRAM, IMAGE PROCESSING APPARATUS, IMAGE-PICKUP OPTICAL APPARATUS, AND NETWORK DEVICE

BACKGROUND OF THE INVENTION

1. Field of the Invention

The present invention relates to an image processing method, a program, an image processing apparatus, an image-pickup optical apparatus, and a network device.

2. Description of the Related Art

In a virtual slide system, a digital object image is obtained by a digital image-pickup optical apparatus, which is referred to as a virtual slide. In general, in the medical field, a specimen (preparation) is prepared as an object by covering a sample with an optical element, such as a cover glass, in a fixed state. The virtual slide includes a microscopic optical system, an image sensor, and an information processing unit, forms a digital image of the preparation, and stores the image data.

A doctor examines the image obtained from the image sensor, but due to random noises generated in the image sensor, such as a charge-coupled device ("CCD"), a complementary metal-oxide semiconductor ("CMOS"), and a photomultiplier tube ("PMT") during the image acquisition, it is necessary to effectively denoise the obtained image. Japanese Patent Laid-Open No. ("JP") 10-304361 proposes a denoising method configured to suppress a high frequency component in a transformed image by applying a discrete cosine transform to the image. JP 2007-274064 discloses a denoising method for an image at an in-focus position by obtaining images at a plurality of different positions in an optical axis direction and by processing a noise component based on the similarity between images. J. B. Sibarita, "Deconvolution Microscopy," in "Microscopy Techniques," Jens Rietdorf edited, U.S. Springer, 2005, p. 201-243, ("Sibarita") proposes a method of obtaining a high resolution image by applying a frequency filter to a plurality of images at a plurality of different positions in the optical axis direction. Another technique of the prior art is Min Gu, "Principles of Three-Dimensional Imaging in Confocal Microscopes," U.S., World Scientific, 1996 ("Gu").

However, the method disclosed in JP 10-304361 has difficulties in denoising a low frequency region. The method disclosed in JP 2007-274064 assumes a constant noise regardless of the position in the optical axis direction or regularly distributed noises with the position in the optical axis direction, and it is therefore difficult to reduce the random noises. The approach disclosed in Sibarita attempts to recover a blurred image due to the optical system, and it does not address denoising.

SUMMARY OF THE INVENTION

The present invention provides an image processing method, a program, an image processing apparatus, an image-pickup optical apparatus, and a network device, configured to effectively reduce noises randomly generated in a low frequency region from an image obtained by an image sensor.

An image processing method according to the present invention is configured to denoise, using an operating unit, three-dimensional image data of an object captured at a plurality of different positions in an optical axis direction of an image-pickup optical system and combined by an image-pickup optical apparatus that includes the image-pickup optical system and an image sensor. The image processing method includes an image transform step of performing a frequency transform for the three-dimensional image data in the optical axis direction and of calculating three-dimensional transformed image data, an image modulation step of reducing an absolute value of the three-dimensional transformed image data in a specific frequency region and of calculating three-dimensional modulated image data, and an inverse image transform step of performing an inverse frequency transform corresponding to the frequency transform for the three-dimensional modulated image data in the optical axis direction and of calculating three-dimensional inversely transformed image data. The specific frequency region is a part of a region expressed by $|f_z|>0.01NA^2/\lambda$ where $f_z$ is a spatial frequency in the optical axis direction, NA is the object-side numerical aperture of the image-pickup optical system, and $\lambda$ is a wavelength of light from the object.

Further features of the present invention will become apparent from the following description of exemplary embodiments with reference to the attached drawings.

DESCRIPTION OF THE EMBODIMENTS

The present invention relates to an image processing method for denoising a sample image captured by an image-pickup optical apparatus. The image processing method may be implemented as a computer executable program and be stored in a recording medium and the like.

The image processing may be performed in the image-pickup optical apparatus, or may be performed by an image processing apparatus (computer) connected to a storage device (memory) configured to store an image from the image-pickup optical apparatus. The image-pickup optical apparatus may also serve as an image processing unit. The obtained image may be displayed on a display unit connected to the image-pickup optical apparatus or the image processing apparatus, or a network device connected to the display unit via a network such as a local area network (LAN), a wide area network (WAN), and the Internet. Then, the cloud computing may be used for the image processing method, and the network device may be a personal computer ("PC") configured to receive the image data. Alternatively, the network device may be a dedicated terminal such as a personal digital assistant ("PDA") or a mobile terminal such as an iPad (registered trademark) having a display unit such as a touch screen. As a result, a remote diagnosis can be realized.

Figure 1:
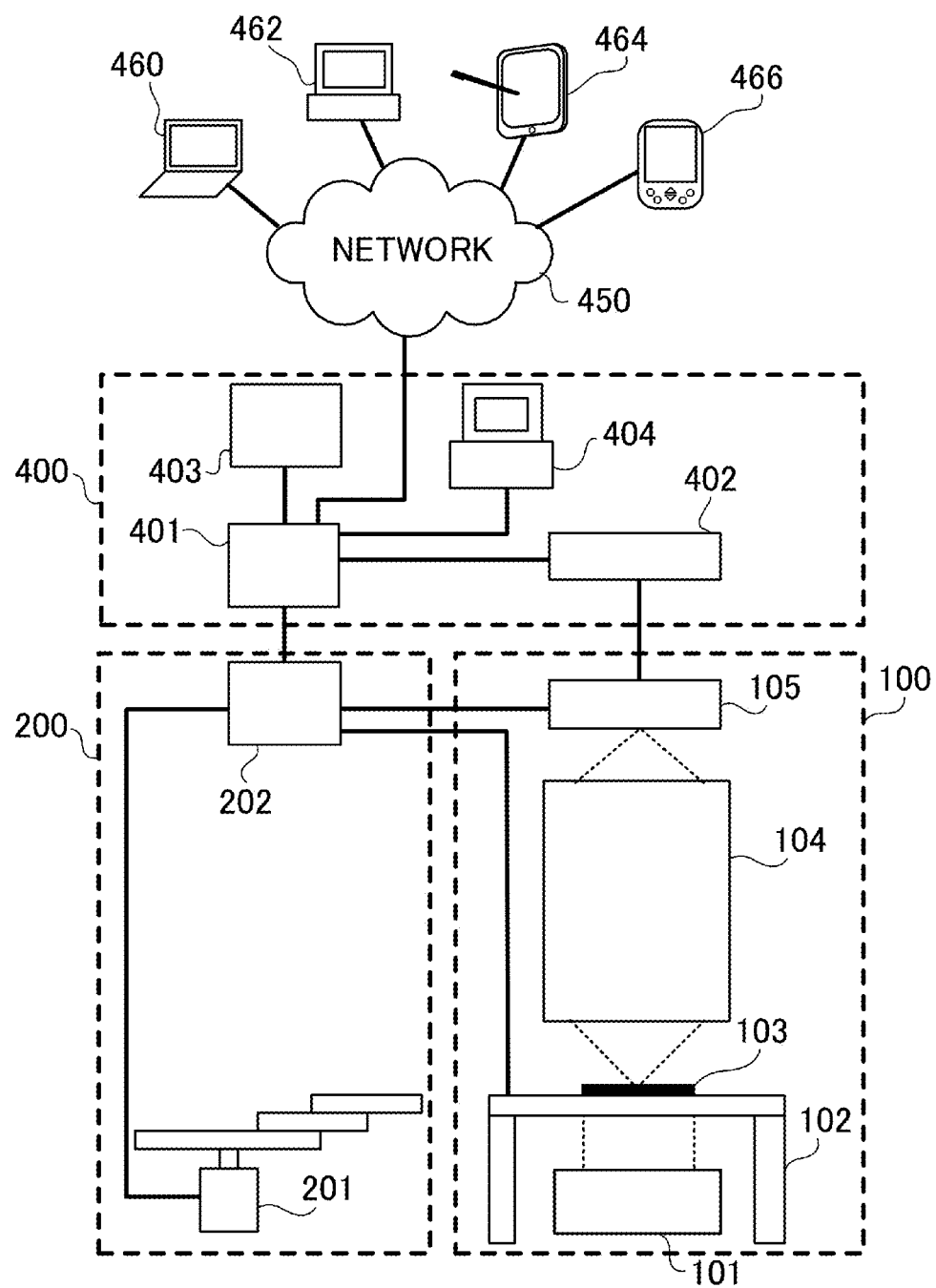
FIG. 1 is a block diagram illustrating a virtual slide according to first, second, and third embodiments of the present invention.

FIG. 1 is a block diagram of a virtual slide according to this embodiment of the present invention. The virtual slide includes an image-pickup unit (image-pickup optical apparatus) 100, a control unit 200, and an information processing unit (image processing apparatus) 400.

The control unit 200 includes a conveyer 201 and a controller 202. The conveyer 201 moves the object 103 on a movable stage 102 based on a command from the controller 202. The movable stage 102 is movable in the optical axis direction in response to a command from the controller 202. The movable stage 102 may move in a direction perpendicular to the optical axis direction. The movable stage 102 enables images to be obtained at different positions in the optical axis direction.

The image-pickup unit 100 is configured to obtain an image of the object 103. The image-pickup unit 100 includes an illumination unit 101, the movable stage 102, an optical system (image-pickup optical system) 104, and an image sensor 105.

The illumination unit 101 has a light source and an illumination optical system to illuminate an object 103 placed on the movable stage 102. An enlarged optical image of an object is formed on the image sensor 105 through the optical system 104.

The image sensor 105 is a photoelectrical converter configured to photoelectrically convert the enlarged optical image of the object and includes a CCD, a CMOS, a PMT, or the like. Random noises occur in the image acquisition using the image sensor 105. An electric signal output from the image sensor 105 is transmitted as image data to the information processing unit 400.

The information processing unit 400 includes a computer (operating unit) 401, an image processor 402, a data storage device (memory) 403, a display unit 404.

The image processor 402 converts the image data transmitted from the image sensor 105 into a digital signal. This digital signal is referred to as a brightness signal. The image processor 402 provides image processing, such as denoising or compressing, for the image data that has been converted into the brightness signal, and transmits the result to the computer 401. The computer 401 transmits the received image data to the data storage device 403. The data storage device 403 stores the transmitted image data. In the medical examination, the computer 401 reads the image data out of the data storage device 403. The computer 401 performs an image processing for the read image data. The transformed image data is transmitted to the display unit 404 so as to display the image.

The computer 401, the image processor 402, the data storage device 403, the display unit 404, and the controller 202 may constitute a single computer. The data may be stored in an external server (not illustrated) connected via a network 450. Then, a plurality of users can remotely access the data. The computer 401 is connected to various network devices via the network 450. Such network devices may include a laptop PC 460, a desktop PC 462, a mobile terminal 464 having a touch screen function, and a dedicated terminal 466 such as a PDA.

The network device has an operating unit, a display unit, a designator, a communication unit, and a storage device. The operating unit includes a computer to control each component or perform necessary operations. The display unit may be integrated into a frame of a network device as in the network devices 460, 464, and 466, or may be a display connected to a network device as in the network device 462. The designator has an input unit such as a touch screen, a keyboard, a stylus pen, and a mouse configured to allow a user to designate any position z in the optical axis direction of the optical system 104. The communication unit is connected to the network 450 and transmits, to the image processing apparatus, information about the position z or image data captured at different positions of N points (where N denotes an integer equal to or greater than 2) in the optical axis direction. The communication unit receives information about the image data of the object 103 at the position z from the image processing apparatus. The information about the image data may be a still image such as a joint photographic experts group (JPEG) or a function I(x, y, z) representing a brightness distribution (pixel value distribution) as described below. The storage device is a memory configured to store an application program for allowing a designation of the position z. The network devices 460, 464, and 466 further include a display unit configured to display an image at the position z based on the information about the image data received via the communication unit.

Figure 2A:
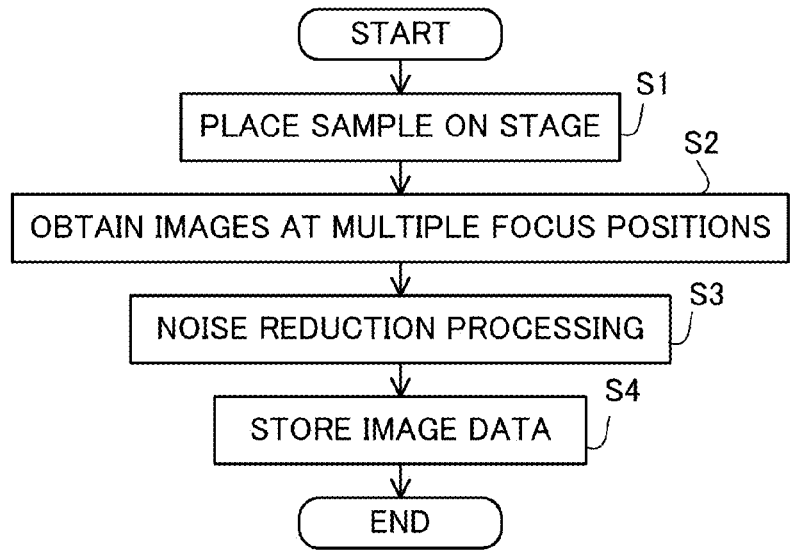
FIGS. 2A and 2B are flowcharts of obtaining an object image according to the first, second, and third embodiments of the present invention.

FIG. 2A illustrates a flowchart of the image acquisition. "S" stands for the "step," and this rule is similarly applied to other flowcharts. An operation of obtaining an enlarged image of the object 103 as the image data using the image sensor 105, the image processor 402, and the computer 401 will be referred to as "image acquisition."

In the step S1, the object 103 is installed in the movable stage 102 by the conveyer 201. In the step S2, the image of the object 103 is obtained at a plurality of different positions along the optical axis. The plurality of different positions may not be in-focus positions. In the step S3, the image processor 402 provides image processing for a plurality of the obtained images. In the image processing, the computer 401 denoises the three-dimensional image data of the object, captured (acquired) at a plurality of different positions in the optical axis direction of the optical system 104 by the image sensor and integrated. In the step S4, the computer 401 stores the denoised image in the data storage device 403. This data may be temporarily stored. The denoising processing in the step S3 and the processing in the step S4 may be reversed. In other words, the stored data may be denoised.

Figure 2B:
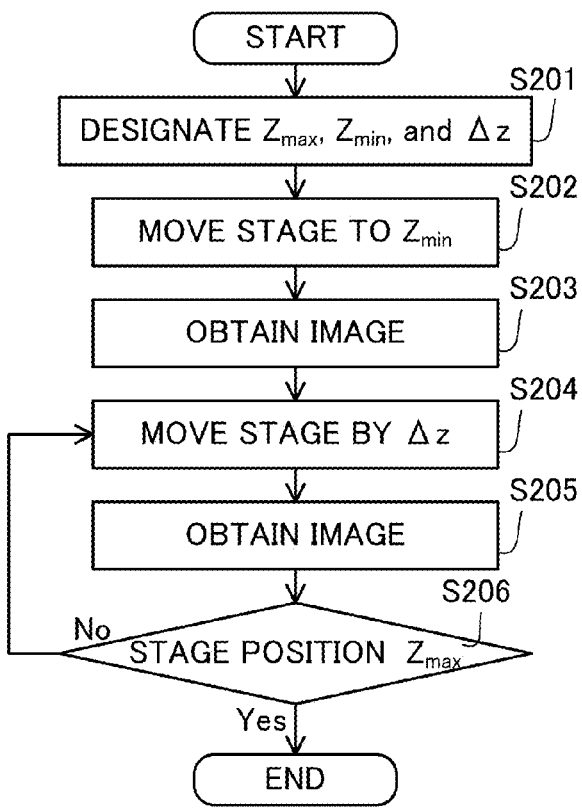

A description will now be given of the image acquisition of the object 103 in the step S2 in more detail. FIG. 2B illustrates a flowchart of the image acquisition.

First, the step S201 designates a stage position changing range and a moving width in the optical axis direction (z-direction). $z_j$ denotes a defocus amount in a propagation direction of the straightforward light, and a position conjugate to the image sensor 105 with respect to the optical system 104 is set as an origin. $z_j$ is equivalent to the position of the optical axis direction and the stage position in the optical axis direction. The step S201 designates a $z_j$ range for obtaining an image (minimum value $z_{min}$ to maximum value $z_{max}$) and a moving width (distance) $\Delta z$ of the image obtaining stage. The moving width $\Delta z$ may not be constant. Such a value may be previously determined based upon the measured surface shape of the sample before the step S201, or may be arbitrarily set by a user. A predefined value set in advance may also be used.

In other words, the image data of the object 103 is obtained by capturing the object 103 through the optical system 104 at different positions $z_j$ ($1 \leq j \leq N$) of N points spaced by the distance $\Delta z$ in the optical axis direction of the optical system 104. $z_{max}$ denotes a maximum value of $z_j$, and $z_{min}$ denotes a minimum value of $z_j$. In the image pickup at N points, positions of each lens of the optical system 104 are maintained, one of the N points is set to an in-focus position, and the remaining points are set to the defocus positions. However, the present invention is not limited to this embodiment.

Then, the step S202 moves the stage to the position $z_{min}$ and the step S203 obtains the object image. After the image acquisition ends, the stage is moved by the distance $\Delta z$ in the step S204, and an image is obtained in the step S205. These steps S204 and S205 are repeated until the stage position reaches or exceeds the maximum value $z_{max}$. This processing enables a plurality of pieces of image data to be obtained by changing the position in the optical axis direction. The method of moving the stage is not limited to this embodiment. For example, after the stage is moved by the distance $z_{max}$ in the step S202, a plurality of images may be obtained by moving the stage in a direction opposite to the above direction by $-\Delta z$. As a result, N pieces of image data are obtained from the object 103 by capturing the object 103 through the optical system 104 at the different positions $z_j$ ($1 \leq j \leq N$) of N points spaced by the distance $\Delta z$ in the optical axis direction of the optical system 104.

According to the present embodiment, the image processor 402 denoises the images obtained at the plurality of positions. A description will now be given of the principle. A description will be given of formulas expressing an optical intensity distribution formed on the image sensor plane through the image-pickup optical system.

Figure 3A:
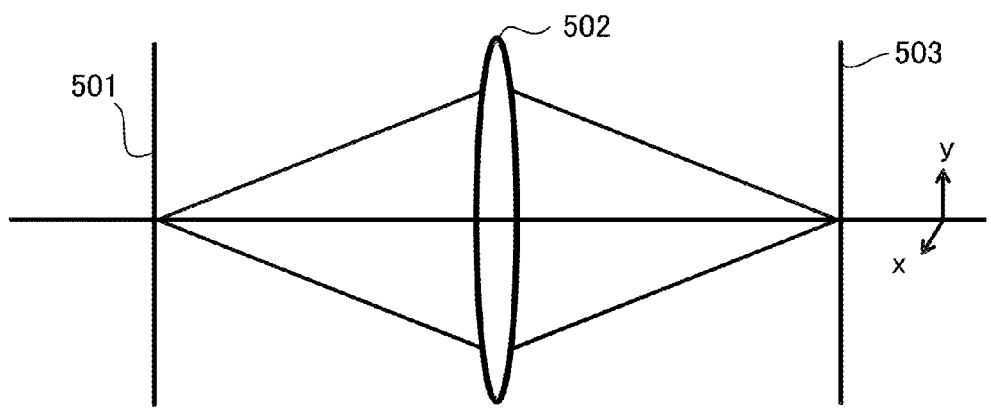
FIGS. 3A and 3B illustrate an optical system for describing a principle of the present invention according to the first, second, and third embodiments.
Figure 3B:
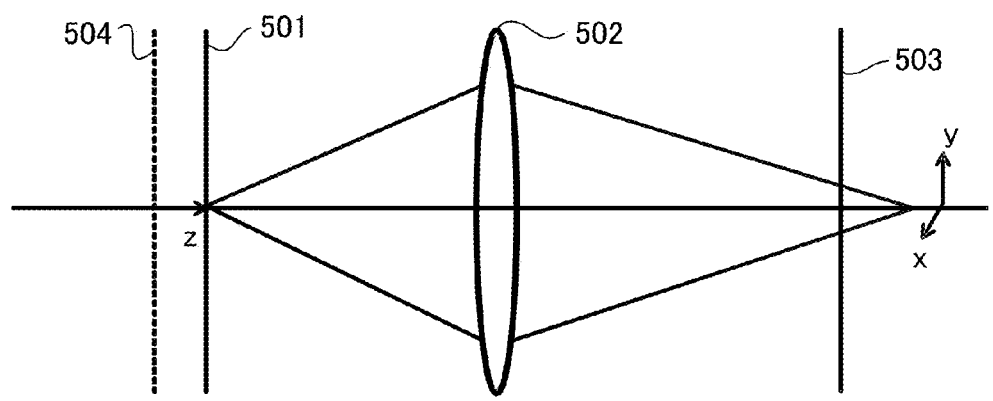

FIGS. 3A and 3B illustrate an optical system for the principle. FIG. 3A illustrates an optical system when an image of the object 501 is formed on the image sensor 503 through the image-pickup optical system 502. FIG. 3B illustrates an optical system when the object 501 shifts by z in the optical axis direction under the same condition as that of FIG. 3A.

Now, assume that illumination light is perfectly coherent and normally incident. When the image of the object 501 is formed on the image sensor 503, an imaging expression is expressed as follows:

$$I(x,y) = |\mathfrak{J}_2^{-1}[O(f_x,f_y)P(f_x,f_y)]|^2 \tag{1}$$

$I(x, y)$ denotes an image intensity distribution on the image sensor 503, and $O(f_x, f_y)$ denotes a diffracted light distribution from the object. $P(f_x, f_y)$ denotes a pupil function of the optical system, x and y denote an orthogonal coordinate to the optical axis on the image plane, $f_x$ and $f_y$ denote a spatial frequency in the x-direction and a spatial frequency in the y-direction, respectively, and $\mathfrak{J}$ denotes a Fourier transform. The subscript "2" of $\mathfrak{J}$ denotes a two-dimensional Fourier transform (frequency transform) along two directions (x-direction and y-direction) orthogonal to the optical axis direction, and the superscript "−1" denotes an inverse Fourier transform (inverse frequency transform). As illustrated in FIG. 3B, as the object 501 moves in the optical axis direction by z, the imaging expression is expressed as follows:

$$I(x,y;z) = |\mathfrak{J}_2^{-1}[O(f_x,f_y)P(f_x,f_y;z)]|^2 \tag{2}$$

$P(f_x, f_y; z)$ is a pupil function obtained by adding a defocus aberration equivalent to the defocus of the object and expressed as follows:

$$P(f_x, f_y; z) = circ\left(\frac{\lambda f_r}{NA}\right)\left\{1 - circ\left(\frac{\lambda f_r}{NA\varepsilon}\right)\right\}\exp(ik_{z0}z - ik_z z) \tag{3}$$

$\lambda$ denotes a wavelength of the illumination light, NA denotes the object-side numerical aperture of the image-pickup optical system, $k_{z0}$ denotes a z-directional component of the wave number of the illumination light, $k_z$ denotes a z-directional component of the wave number of the diffraction light, and $f_r = (f_x^2 + f_y^2)^{1/2}$. For simplicity purposes, assume that the magnification is once. In addition, assume that a circular shield is located at the center of the pupil plane of the image-pickup optical system and has a radius thereof is $\varepsilon$ times as long as the pupil radius. While this embodiment assumes the shield near the vicinity of the center of the pupil plane, the present invention is not limited to this embodiment. The same effect can be obtained if the light intensity near the center of the pupil plane is weaker than that of the periphery. The shield is not necessarily arranged in the pupil plane of the image-pickup optical system. The shield may not be necessarily circular as long as a filter designed such that the light intensity distribution on the pupil plane is weak near the center is be arranged in the optical path of the image-pickup optical system. When there is no central shield, the curly brace of the expression 3 may be omitted.

The z-directional component of the wave number is expressed as follows:

$$k_z = 2\pi\sqrt{\frac{1}{\lambda^2} - f_r^2} \quad (4)$$

$$k_{z0} = 2\pi\sqrt{\frac{1}{\lambda^2} - f_{r0}^2} \quad (5)$$

$f_{x0}$ and $f_{y0}$ are made by dividing the wave number components in the x-direction and the y-direction, respectively, of the incident light by $2\pi$, and $f_{r0} = (f_{x0}^2 + f_{y0}^2)^{1/2}$ is established. Since the normal incidence is assumed, $f_{x0} = f_{y0} = 0$. The circ function is expressed as follows:

$$\mathrm{circ}(f_r) = \begin{Bmatrix} 1 & f_r \leq 1 \\ 0 & f_r > 1 \end{Bmatrix} \quad (6)$$

Changing the position in the optical axis direction in obtaining the image data corresponds to changing z of I(x, y, z) in the expression 2. While the expression 2 assumes that the object moves in the optical axis direction, a similar discussion is applied to a case where the image sensor is moved in the optical axis direction.

Assume a region where a spectrum of I(x, y, z) is non-zero. The spectrum of I(x, y, z) is three-dimensional data obtained by performing a three-dimensional Fourier transform for I(x, y, z). When the three-dimensional transform is performed for I(x, y, z), the expression 2 is modified as follows:

$$\mathfrak{I}_3[I(x,y,z)] = \{O(f_x,f_y)CTF(f_x,f_y,f_z)\} \otimes_3 \{O^*(-f_x,-f_y) CTF(-f_x,-f_y,-f_z)\} \quad (7)$$

$CTF(f_x, f_y, f_z)$ denotes a function expressed by an expression 8 representative of a characteristic of the image-pickup optical system, and corresponding to a Fourier transform for the pupil function with respect to z, where $\otimes$ denotes a convolution integration, and the subscript "3" denotes the convolution integration for three coordinate values $f_x$, $f_y$, and $f_z$. The superscript * denotes a complex conjugate. The subscript "3" of $\mathfrak{I}$ indicates a three-dimensional Fourier transform for three coordinate values x, y, and z.

$$CTF(f_x, f_y, f_z) = \quad (8)$$

$$\mathrm{circ}\left(\frac{\lambda f_r}{NA}\right)\left\{1 - \mathrm{circ}\left(\frac{\lambda f_r}{NA\varepsilon}\right)\right\}\delta\left(f_z + \sqrt{\frac{1}{\lambda^2} - f_{r0}^2} - \sqrt{\frac{1}{\lambda^2} - f_r^2}\right)$$

Figure 4:
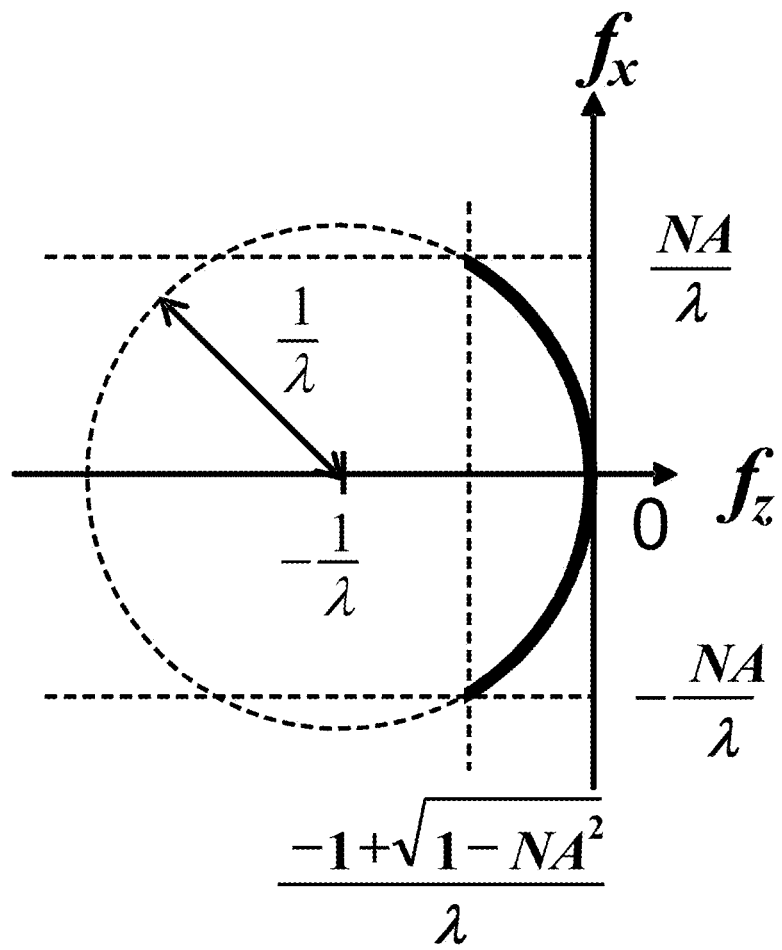
FIG. 4 is a sectional view of CTF at $f_y=0$ according to the first, second, and third embodiments.

FIG. 4 illustrates a section at $f_y=0$ in the function $CTF(f_x, f_y, f_z)$. In the expression 8, CTF is a product of the circ function and the $\delta$ function. Since the normal incidence is assumed, $f_{r0}=0$ will be considered. From the characteristic of the $\delta$ function, CTF becomes non-zero only on the curved surface satisfying $f_z + 1/\lambda - (1/\lambda^2 - f_r^2)^{1/2} = 0$. This represents a spherical surface centered at $f_z = -1/\lambda$ in a spatial frequency domain with a radius of $1/\lambda$. Due to the characteristic of the circ function, $CTF(f_x, f_y, f_z)$ is non-zero only when $NA\varepsilon/\lambda \leq f_r \leq NA/\lambda$. Therefore, $CTF(f_x, f_y, f_z)$ is non-zero only in the bold line portion in FIG. 4. For simplicity purposes, no central shield is assumed.

Figure 5A:
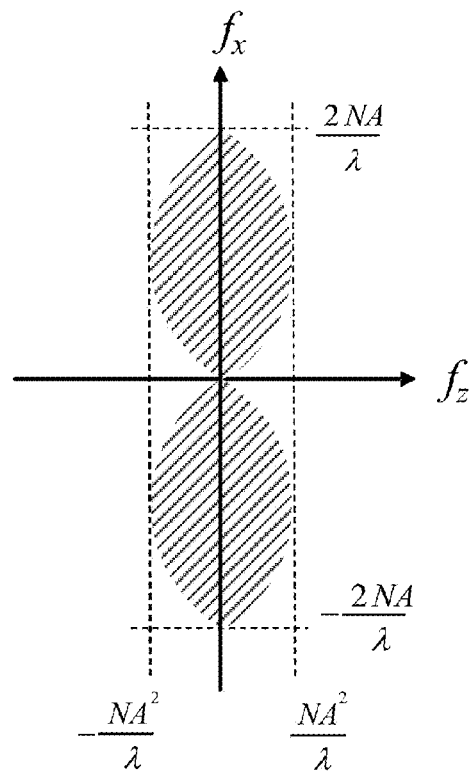
FIG. 5A is a diagram illustrating a region where a spectrum of an image at a cross section of $f_y=0$ becomes non-zero according to the first, second, and third embodiments.

Since $O(f_x, f_y)$ is generally non-zero over the entire spatial frequency domain, the region where the spectrum of I(x, y, z) is non-zero depends upon the region where $CTF(f_x, f_y, f_z)$ is non-zero. In order to specify the region where the spectrum of I(x, y, z) is non-zero, $O(f_x, f_y)=1$ will be considered. Then, the spectrum of I(x, y, z) is expressed as the autocorrelation of $CTF(f_x, f_y, f_z)$. As a result of the convolution integration, the region where the spectrum of I(x, y, z) is non-zero is indicated by the hatched area in FIG. 5A. For simplicity purposes, no central shield is assumed by introducing the paraxial approximation. In other words, $CTF(f_x, f_y, f_z)$ is approximated by an expression 9.

$$CTF(f_x, f_y, f_z) \approx \mathrm{circ}\left(\frac{\lambda f_r}{NA}\right)\delta\left(f_z + \frac{1}{\lambda} - \frac{\lambda f_r^2}{2}\right) \quad (9)$$

When the expression 9 is substituted for the expression 7 with $O(f_x, f_y)=1$, the expression 7 is modified into an expression 10.

$$\frac{2}{\lambda f_r}\sqrt{NA^2 - \left(\frac{|f_z|}{f_r} + \frac{\lambda f_r}{2}\right)^2} \quad (10)$$

The expression 10 results in zero in a region other than that of an expression 11.

$$NA^2 - \left(\frac{|f_z|}{f_r} + \frac{\lambda f_r}{2}\right)^2 \geq 0 \quad (11)$$

In other words, the spectrum of I(x, y, z) is non-zero only in a region where the expression 11 is satisfied.

From the expression 11, a breadth of the spectrum of I(x, y, z) in the $f_z$ direction is expressed by an expression 12.

$$|f_z| \leq \frac{NA^2}{2\lambda} \quad (12)$$

An expression 13 is used for a partially coherent imaging system instead of the expression 2.

$$I(x, y, z) = \int_{-\infty}^{\infty}\int_{-\infty}^{\infty} S(f_{x0}, f_{y0}) \quad (13)$$

$$|\mathfrak{I}_2^{-1}[O(f_x, f_y)P(f_x - f_{x0}, f_y - f_{y0}; z)]|^2 df_{x0}\, df_{y0}$$

$S(f_{x0}, f_{y0})$ denotes an intensity distribution of an effective light source. The effective light source is a light intensity distribution formed on the pupil plane of the imaging optical system by the illumination optical system when there is no object. Since the pupil function P in the expression 11 is the pupil function of the expression 3 moved in parallel by $f_{x0}$ and $f_{y0}$, the shape of $CTF(f_x, f_y, f_z)$ obtained from the pupil function P in the expression 11 is the same as the bold line of FIG. 4. The region where the spectrum is non-zero is applied to the term expressed by a square of an absolute value of an integrand in the expression 13, as discussed above. Thus, the region where the spectrum of I(x, y, z) is non-zero is expressed by the expression 11 even in the partially coherent imaging system.

Since the incoherent imaging system is nearly equivalent to $S(f_{x0}, f_{y0})=1$, the region where the spectrum of I(x, y, z) is non-zero is also expressed by the expression 11 even in the incoherent imaging system.

Thus, in a typical optical system, the region where the spectrum of I(x, y, z) is non-zero is expressed by the expression 11 regardless of a coherency state of the illumination light.

A description will now be given of a region where a spectrum of an image is non-zero when the object image is obtained through a confocal optical system.

The confocal optical system utilizes the point illumination and point detection. An expression 14 defines an imaging expression in observing the light transmitting through an object or light reflected from the object. In the expression 14, "−/+" denotes a confocal optical system for observing transmission light, and "+/−" denotes a confocal system for observing reflection light in the same order of double signs.

$$\Im_3[I(x,y,z)]=[O(f_x,f_y)\{CTF(f_x,f_y,f_z)\otimes_3 CTF(\mp f_x,\mp f_y,\mp f_z)\}]\otimes_3 [O^*(-f_x,-f_y)\{CTF(-f_x,-f_y,-f_z)\otimes_3 CTF(\pm f_x,\pm f_y,\pm f_z)\}] \quad (14)$$

An expression 15 defines an imaging expression for the confocal optical system in observing fluorescent light from a dyed object, because an image is incoherently formed in the course of the absorption of the illumination light and generation of fluorescent light.

$$\Im_3[I(x,y,z)]=O_f(f_x,f_y)[\{CTF(f_x,f_y,f_z)\otimes_3 CTF(\mp f_x,\mp f_y,\mp f_z)\}\otimes_3 \{CTF(-f_x,-f_y,-f_z)\otimes_3 CTF(\pm f_x,\pm f_y,\pm f_z)\}] \quad (15)$$

Figure 5B:
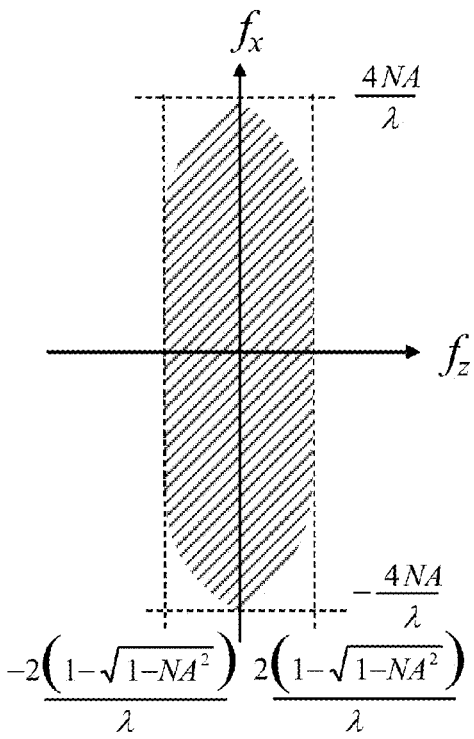
FIG. 5B is a diagram illustrating a region where a spectrum of an image of a confocal optical system at a cross section of $f_y=0$ becomes non-zero according to the first, second, and third embodiments.

$O_f$ denotes a Fourier transform of the light emission efficiency of the object. Since $O(f_x, f_y)=1$ is also assumed in the confocal optical system, the region where the spectrum of I(x, y, z) is non-zero can be derived. When $O(f_x, f_y)=1$, the expressions 14 and 15 are modified into an expression 16, which defines a region where the spectrum of I(x, y, z) is non-zero. The expression 16 corresponds to an autocorrelation computation when $O(f_x, f_y)=1$ in the right term of the expression 7. Through the autocorrelation, the region where the spectrum of I(x, y, z) is non-zero is wider than that of the expression 11. FIG. 5B illustrates a section at $f_y=0$ in the region where the spectrum of the image obtained through the confocal optical system as a result of computation of the expression 16 is non-zero. For this computation, see Gu. It is understood from FIG. 5B that the spectrum of I(x, y, z) is non-zero in the region satisfying the expressions 17 and 18.

$$\Im_3[I(x, y, z)] = \{CTF(f_x, f_y, f_z) \otimes_3 CTF(-f_x, -f_y, f_z)\} \otimes_3 \{CTF(-f_x, -f_y, -f_z) \otimes_3 CTF(f_x, f_y, f_z)\} \quad (16)$$

$$|f_r| \leq \frac{4\,NA}{\lambda} \quad (17)$$

$$|f_z| \leq \frac{2(1-\sqrt{1-NA^2})}{\lambda} \quad (18)$$

As described above, the spectrum of I(x, y, z) is non-zero only in the region defined by the optical system. If a value exists in a region other than the predefined region, this means that the image has a spectral component caused by the noises and not contained in the original image. Hence, for the obtained spectrum of the image, the predefined region remains as it is, and the value is set to zero in other regions. In other words, a three-dimensional low-pass filter provides denoising.

Referring now to the flowchart of FIG. 6, a description will be given of a denoising method (image processing method) described above.

Initially, the step S301 performs a three-dimensional Fourier transform for a plurality of obtained images and obtains a three-dimensional spectrum of the images. The step S301 serves as an image transform step for calculating three-dimensional transformed image data by performing a frequency transform for the three-dimensional image data at least in an optical axis direction (although this embodiment contains the optical axis direction and two directions orthogonal to the optical axis). However, an example of the frequency transform is not limited to the Fourier transform, and a cosine transform may also be used.

The step S302 applies a three-dimensional low-pass filter to the obtained spectrum. The step S302 serves as an image modulation step for calculating three-dimensional modulated image data by reducing the absolute value of the three-dimensional transformed image data in the specific frequency region. The information on the original image exists in the specific region defined by the expressions 11, 12, 17, and 18. Thus, the low-pass filter as a frequency filter in which the region expressed by the conditional expression of the expression 11, 12, 17, or 18 is non-zero can reduce the noises without losing the original image information.

For example, in the expression 11, the specific frequency region where the absolute value of the three-dimensional transformed image data is to be reduced is a part of the region expressed by the following expression.

$$NA^2 - \left(\frac{|f_z|}{f_r} + \frac{\lambda f_r}{2}\right)^2 < 0 \quad (11')$$

Alternatively, in the expression 12, 17, or 18, the specific frequency region is a part of the region expressed by the following expressions.

$$|f_z| > \frac{NA^2}{2\lambda} \quad (12')$$

$$|f_r| > \frac{4\,NA}{\lambda} \quad (17')$$

$$|f_z| > \frac{2(1-\sqrt{1-NA^2})}{\lambda} \quad (18')$$

The step S303 performs a three-dimensional inverse Fourier transform for the filtered spectrum. The step S303 serves as an inverse image transform step of calculating three-dimensional inverse transformed image data by performing an inverse frequency transform corresponding to the frequency transform for the three-dimensional modulated image data at least in an optical axis direction (although this embodiment contains the optical axis direction and two directions orthogonal to the optical axis).

The denoised image can be thus obtained.

The frequency filter denoises components in regions other than the specific region defined by the expression 11, 12, 17, or 18 in the spectrum of the image. This means that a denoising effect is higher as the regions other than the specific region defined by the expression 11, 12, 17, or 18 are wider. The spectrum of the image is obtained in a range of $|f_z| \leq \frac{1}{2}\Delta z$. The spectrum of the image is limited to a range expressed by the expression 12 in the typical optical system or to a range expressed by the expression 18 in the confocal microscope. For a sufficient denoising effect, the range may be set to $\frac{1}{2}\Delta z \geq NA^2/2\lambda$ in the standard microscope or $\frac{1}{2}\Delta z \geq NA^2/\lambda$ in the confocal microscope. The step width $\Delta z$ for obtaining an image may satisfy the expression 19 in the typical optical system or satisfy the expression 20 in the confocal microscope.

$$|\Delta z| \leq \frac{\lambda}{NA^2} \qquad (19)$$

$$|\Delta z| \leq \frac{\lambda}{4(1-\sqrt{1-NA^2})} \qquad (20)$$

The diffracted light distribution from the typical object, such as light transmitting through a biological sample or light reflected from a person or a landscape has a smaller value as the frequency increases. Thus, the low-pass filter may be applied which is further limited to the region defined by the optical system.

Figure 6:
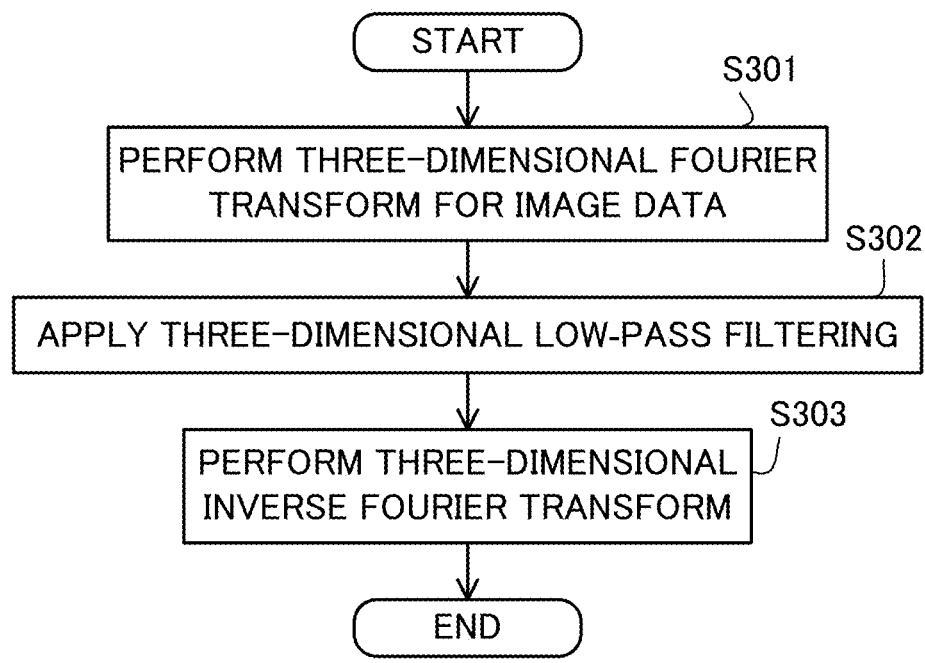
FIG. 6 is a flowchart illustrating an image processing method according to the first, second, and third embodiments of the present invention.

Although the flowchart of FIG. 6 obtains the three-dimensional spectrum using a Fourier transform, the transform method is not limited to this embodiment. For example, a cosine transform may also be employed. However, since the frequency used in the cosine transform is twice as high as that of the Fourier transform, it is necessary to change the conditional expressions of the expressions 11, 12, 17, and 18 twice. In other words, the conditional expression used for the cosine transform is obtained by replacing the frequencies $f_r$ and $f_z$ in the four expressions with $f_r/2$ and $f_z/2$, respectively. Since a base period of the cosine transform is twice as long as that of the Fourier transform, the denoising precision becomes higher.

First Embodiment

A description will now be given of a denoising method according to a first embodiment of the present invention.

An object image is obtained through the simulation. Assume that the object-side numerical aperture NA of an image-pickup optical system is 0.7, an imaging magnification ratio is ×40, illumination light is monochromatic and has a wavelength of 550 nm, a pixel size of an image sensor is 4 μm, and the pixel has an area aperture ratio of 50%. In addition, assume that the illumination is partially coherent, and an effective light source has a circular shape. $NA_i/NA=0.7$ is satisfied where $NA_i$ is the numerical aperture of the illumination optical system.

Figure 7:
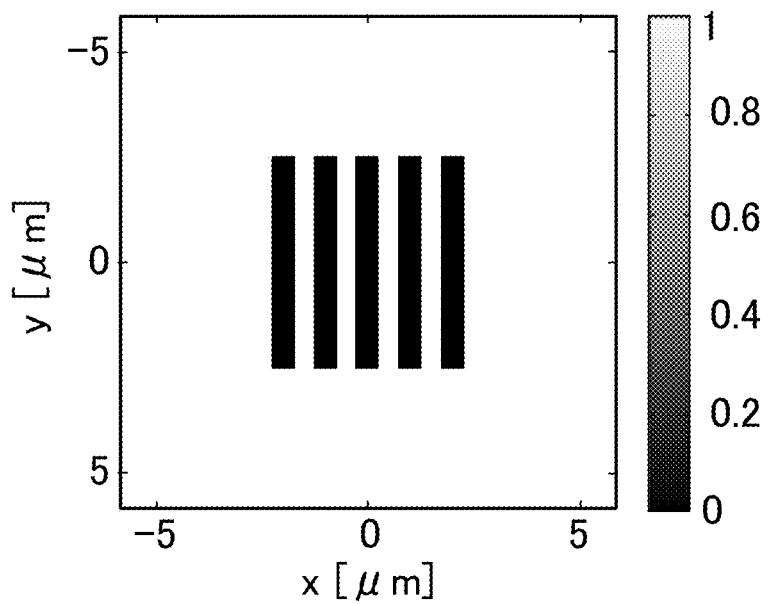
FIG. 7 illustrates a distribution of an amplitude transmission of an object according to the first embodiment.
Figure 8:
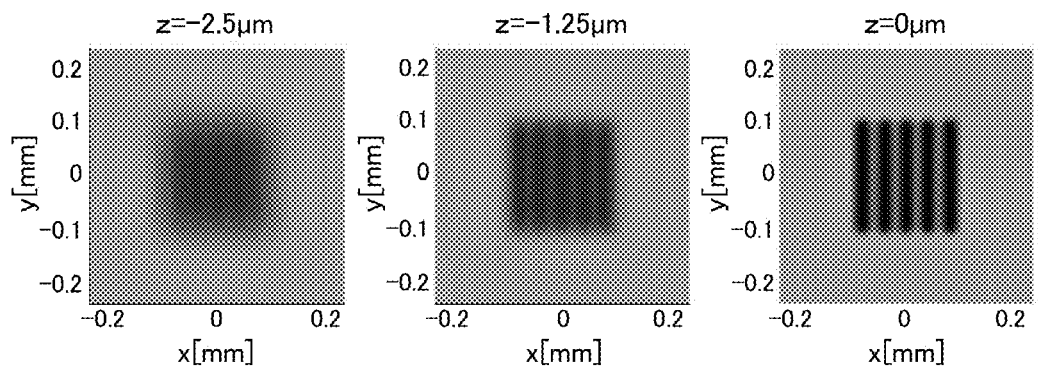
FIG. 8 is a diagram illustrating an object image obtained at different positions in the optical axis direction according to the first embodiment.

FIG. 7 illustrates an amplitude transmission of the object. The object is a line chart having a width of 0.5 μm. In the calculation, it is assumed that the object is two-dimensional. Naturally, this method is also applicable to an object that has a thickness. A brightness distribution of an image is calculated by changing a position in the optical axis direction by 0.25 μm from −4.0 μm to 4.0 μm. FIG. 8 illustrates illustrative images obtained by changing the position of the optical axis direction. The axis of the image indicates a position on the surface of the image sensor.

Random noises are added to the image. A 10% Gaussian noise is assumed as a random noise. The Gaussian noise is expressed by the expression 21.

$$\text{Noise}=a(1+\text{Gaussian}(\sigma,m)) \qquad (21)$$

Figure 9:
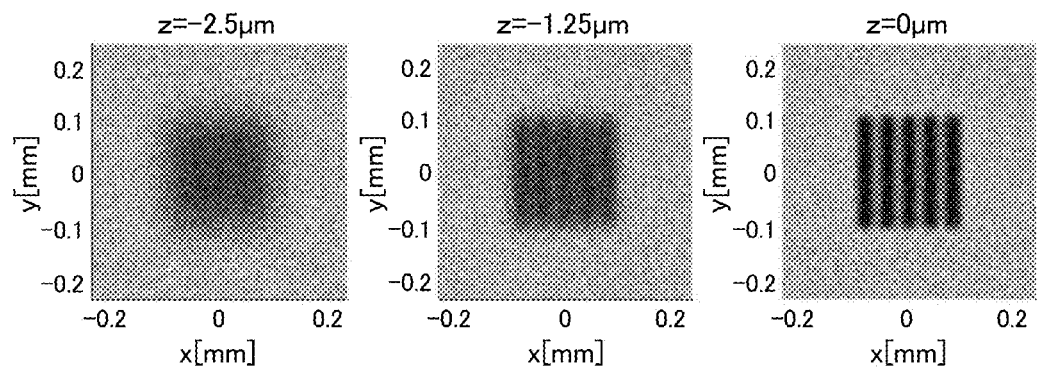
FIG. 9 is a diagram illustrating an image obtained by adding a noise to the image of FIG. 8 according to the first embodiment.

Gaussian(σ,m) denotes a Gaussian random number according to a Gaussian distribution having a standard deviation of σ and an average of m regarding appearance frequency P(i) of the number "i." Herein, "a" denotes a constant. The 10% Gaussian noise means that the value "a" in the expression is 10% as large as the maximum brightness of the image, the standard deviation σ is 1, and the average m is zero. FIG. 9 illustrates exemplary images obtained by noising a series of images obtained by changing the position in the optical axis direction. When FIG. 9 is compared with FIG. 8, it is understood that the entire image is noised.

A description will now be given of an image processing method according to this embodiment.

Figures 10A, 10B:
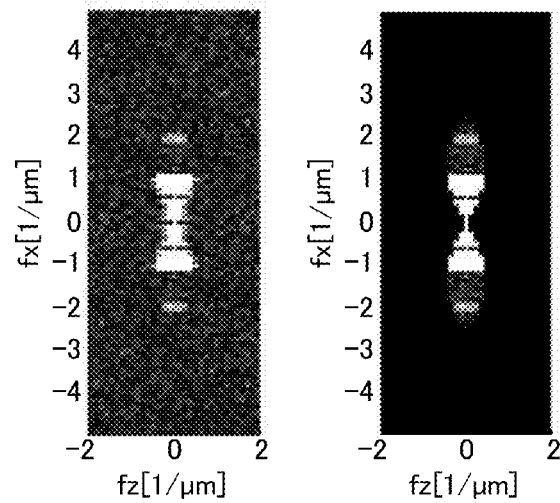
FIG. 10A is a sectional view of an absolute value of a spectrum at $f_y=0$ according to the first embodiment.
FIG. 10B is a sectional view illustrating an absolute value of a spectrum at $f_y=0$ after the filtering processing is given according to the first embodiment of the present invention.

I(x, y, z) denotes a brightness distribution of the image at a position z in the optical axis direction. A three-dimensional discrete Fourier transform is performed for x, y, and z of I(x, y, z) to obtain $I'(f_x, f_y, f_z)$. FIG. 10A illuminates an absolute value of obtained $I'(f_x, f_y, f_z)$ in a section of $f_y=0$. The value of $I'(f_x, f_y, f_z)$ is high in the region illustrated in FIG. 5A, and random signals exist in other regions. These random signals are considered as noise components. Therefore, the noise is reduced by taking a product between each element of $I'(f_x, f_y, f_z)$ and the filter by setting the region illustrated in FIG. 5A to non-zero and other regions to zero. Taking the product between the filter and each element of $I'(f_x, f_y, f_z)$ will be referred to as filtering.

An applied filter is 1 for the region satisfying the expression 11 and 0 for other regions. Of course, other filters may also be employed.

$I''(f_x, f_y, f_z)$ denotes a filtered spectrum. FIG. 10B illustrates an absolute value of $I''(f_x, f_y, f_z)$ at the section of $f_y=0$. As a result, a spectrum is obtained, in which the value is finite only in the region illustrated in FIG. 5A, and the value becomes zero in other regions. This filtering removes random signals shown in $I'(f_x, f_y, f_z)$ in the region other than that illustrated in FIG. 5A.

Figure 11:
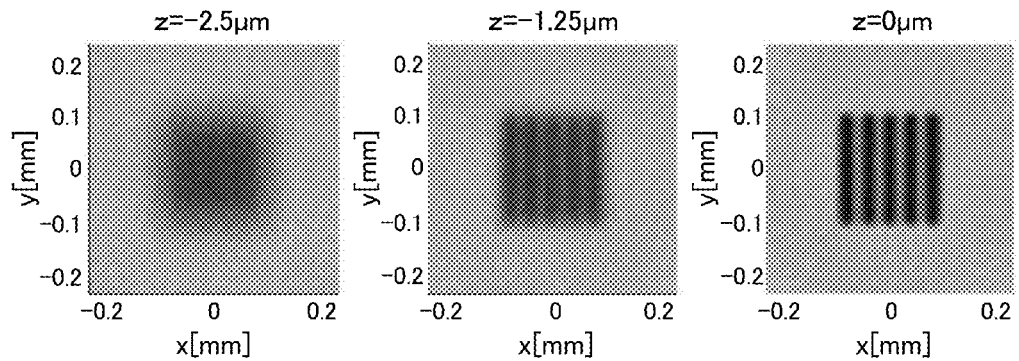
FIG. 11 is a diagram illustrating a filtered image according to the first embodiment of the present invention.

A three-dimensional inverse Fourier transform is performed for $f_x$, $f_y$, and $f_z$ of $I''(f_x, f_y, f_z)$. FIG. 7 illustrates a series of resultant images. It is understood that FIG. 11 can reduce more noises than FIG. 9.

Figure 12:
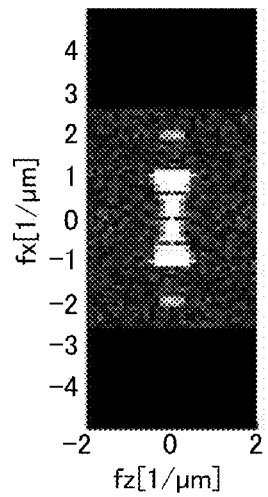
FIG. 12 is a sectional view illustrating an absolute value of a spectrum at $f_y=0$ after the conventional filtering processing is given.

This embodiment will be compared with the prior art. The conventional image processing method applies a two-dimensional low-pass filter to each image. In other words, the value of the region of $(f_x^2+f_y^2)^{1/2}>2NA/\lambda$ of the spectrum $I'(f_x, f_y, f_z)$ is set to zero. $I''_2(f_x, f_y, f_z)$ is a conventional filtered spectrum. FIG. 12 illustrates an absolute value of $I''_2(f_x, f_y, f_z)$ in a section of $f_y=0$. When FIG. 12 is compared with FIG. 10A, a random signal in the region of $f_x>2NA/\lambda$ is removed in FIG. 12 but when FIG. 12 is compared with FIG. 10B, a random signal remains in the high frequency region of $f_z$.

Figure 13:
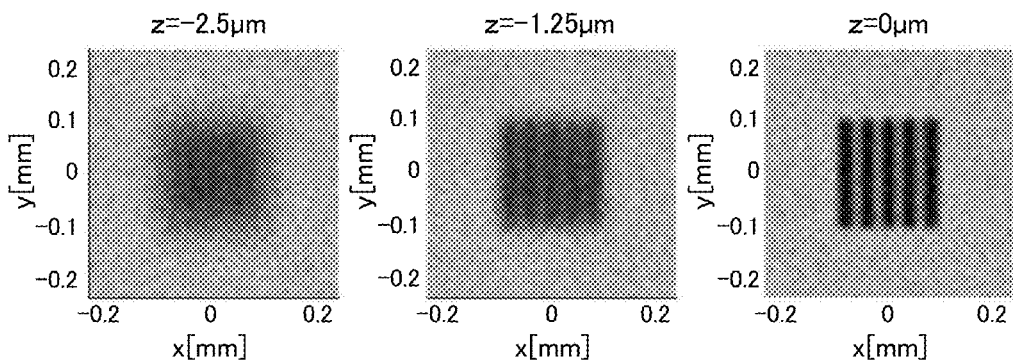
FIG. 13 is a diagram illustrating a filtered according to the prior art.

FIG. 13 illustrates an image obtained by performing a three-dimensional inverse Fourier transform for $I''_2(f_x, f_y, f_z)$ with respect to $f_x$, $f_y$, and $f_z$. When FIG. 13 is compared with FIG. 9, it is understood that this embodiment reduces more noises, and when FIG. 12 is compared with FIG. 11, it is understood that this embodiment has a higher denoising effect.

In order to quantifying the difference of the image, a peak signal-to-noise ratio ("PSNR") is calculated based on the pre-noised image. The PSNR quantifies the similarity of images based on the values calculated by expressions 22 and 23. The PSNR is set to be equal to or greater than zero. As the PSNR increases, the similarity of images increases. In this embodiment, as the PSNR increases, the denoising effect becomes higher.

$$PSNR(z) = 10\log_{10}\left(\frac{255^2}{MSE(z)^2}\right) \qquad (22)$$

$$MSE(z) = \sqrt{\frac{\sum_p^{N_p}\sum_q^{N_q}(I(x_p, y_q, z) - I_{rst}(x_p, y_q, z))^2}{N_p N_q}} \qquad (23)$$

$I_{rst}$ (x, y, z) denotes a denoised image. The expression 22 is an expression corresponding to an 8-bit image.

Figure 14:
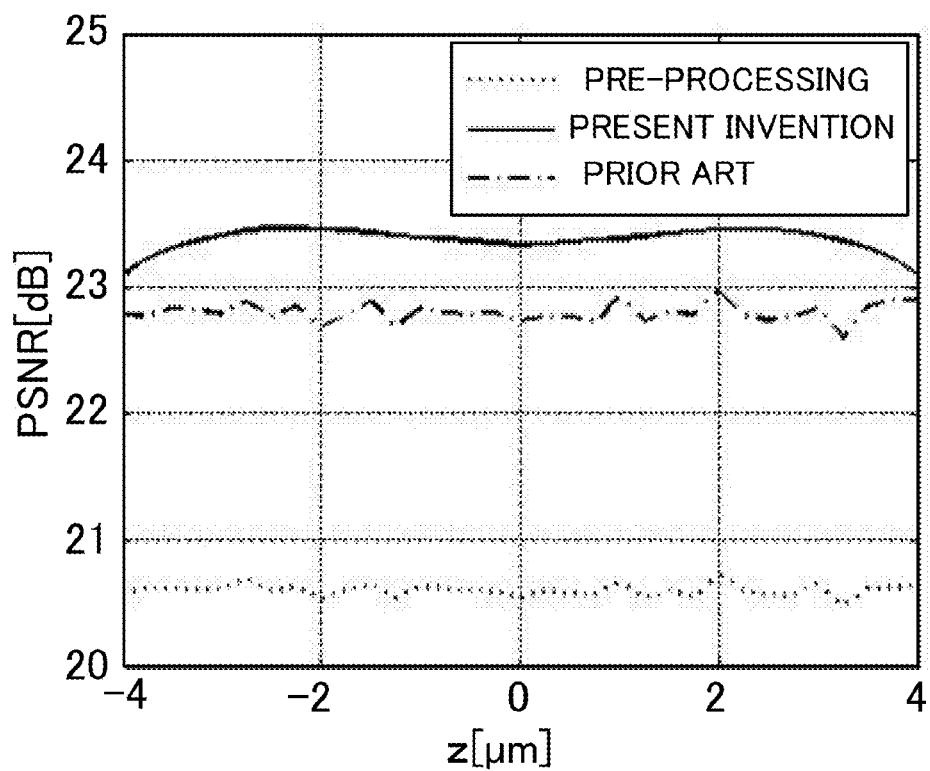
FIG. 14 is a graph illustrating PSNR for a position z in the optical axis direction according to the first embodiment.

FIG. 14 illustrates the PSNR at the position z. A dotted line denotes the PSNR of the noised image. An alternate short and long dash line denotes the PSNR of an image obtained by the conventional image processing method. A solid line denotes the PSNR of an image obtained by the image processing method according to this embodiment. Throughout all z values, the solid line is greater than that of the alternate short and long dash line. This means that this embodiment has a higher denoising effect than that of the prior art.

A filter having a higher denoising effect will be described.

A diffracted light distribution from a typical object has a smaller value as the spatial frequency increases. Thus, a spectral component having a high spatial frequency may be weaker than a noise signal. As a result, a region satisfying the expression 11 may cause the image degradation. Hence, the denoising effect can be improved by using a low-pass filter having a region narrower than that of the filter defined by the expression 11. However, in this case, since a diffracted light component caused by an object is also reduced, the image deteriorates. The filtering level depends upon a user's permissible range of the processed image.

A filter is created so as to be narrower than an analytically calculated region. A filter in which the region satisfying all of expressions 11, 24, and 25 is non-zero is used for a new filter, where $f_r$ denotes a spatial frequency in a direction perpendicular to the optical axis, and $f_z$ denotes a spatial frequency of the optical axis direction.

$$C_r \geq |f_r| \quad (24)$$

$$C_z \geq |f_z| \quad (25)$$

Figure 15:
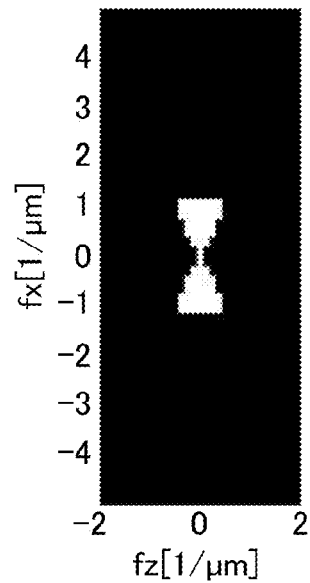
FIG. 15 is a sectional view at $f_y=0$ in an improved filter according to the first embodiment.

$C_r$ and $C_z$ denote integers that can be arbitrarily set by a user. For example, FIG. 15 illustrates a filter created with $C_r=0.9NA/\lambda$ and $C_z=0.5NA^2/\lambda$ (the expression 12') in a section of $f_y=0$. When FIG. 15 is compared with FIG. 5A, it is understood that the non-zero region is narrower in the $f_x$ direction.

Figure 16:
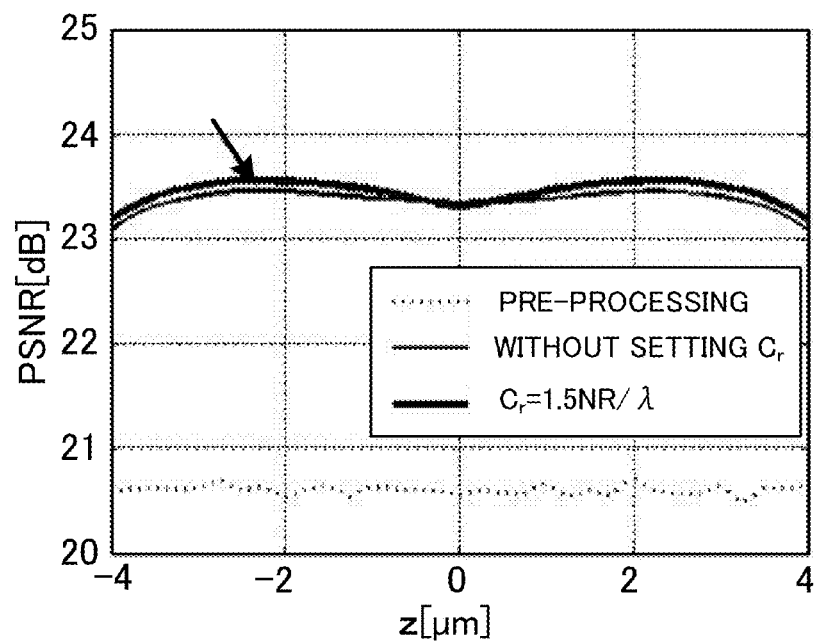
FIG. 16 is a graph illustrating the PSNR for the position z in the optical axis direction with the filter of FIG. 15 according to the first embodiment.

FIG. 16 illustrates the PSNR for the image denoised by the above filter. A bold line corresponds to use of a filter created with $C_r=0.9NA/\lambda$. For easy understanding, an arrow is illustrated. A narrow solid line corresponds to use of the filter defined only by the expression 11. A dotted line corresponds to no filter. The value of the bold line is higher than a value of any of the lines or that of the narrow solid line. Thus, the filter created with the conditions of the expressions 24 and 25 has a higher denoising effect.

Proper $C_r$ and $C_z$ depend on the object. For example, $C_r$ is $0.01NA/\lambda$ and may be $0.9NA/\lambda$. Similarly, $C_z$ is $0.01NA^2/\lambda$ and may be $0.5NA^2/\lambda$. Therefore, the specific frequency region used to reduce the absolute value of the three-dimensional transformed image data may be a part of the region represented by such a conditional expression as $|f_z|>0.01NA^2/\lambda$ or $|f_z|>0.5NA^2/\lambda$. Alternatively, the specific frequency region may be a part of the region represented by such a conditional expression as $|f_r|>0.01NA/\lambda$ or $|f_z|>0.9NA/\lambda$.

This embodiment uses a line chart having a width of 0.5 μm for an object, but the present invention is not limited to this embodiment. For example, a tissue of a biological body, a substrate of a semiconductor, a landscape, or a person may also be used.

This embodiment sets the filter using the expression 10 that assumes the paraxial approximation but a filter obtained by using no paraxial approximation may also be used. For example, a filter may be set by calculating the expression 7 using a computer and by obtaining the non-zero region.

This embodiment uses a Fourier transform but the present invention is not limited to this embodiment. For example, a cosine transform may also be employed. Since the frequency of the cosine transform is twice as high as that of the Fourier transform, it is necessary to replace $f_r$ and $f_z$ with $f_r/2$ and $f_z/2$, respectively, in the expressions 11, 24, and 25.

For example, when the cosine transform is used for the frequency transform, the expressions 11', 12', 17', and 18' are defined as follows.

$$NA^2 - \left(\frac{|f_z|}{f_r} + \frac{\lambda f_r}{4}\right)^2 < 0 \quad (11'')$$

$$|f_z| > \frac{NA^2}{\lambda} \quad (12'')$$

$$|f_r| > \frac{8\,NA}{\lambda} \quad (17'')$$

$$|f_z| > \frac{4(1 - \sqrt{1 - NA^2})}{\lambda} \quad (18'')$$

While this embodiment assumes the monochromatic light having a wavelength of 550 nm, the present invention is not limited to this embodiment. For example, illumination or image-pickup may be performed with polychromatic light emitted by a plurality of light-emitting diodes, or using illumination light having a wide wavelength using a halogen lamp or the like. In this case, the operating wavelength may be within a wavelength range used in a biological imaging or a typical photographing, such as 300 to 1500 nm. Then, the image sensor may operate in response to the above wavelength range. The image-pickup optical apparatus may obtain spectroscopic data in the above wavelength range. If the operating light is not monochromatic and the shortest one of the wavelengths of the operating light is set as a wavelength in the filter setting, the noise can be reduced without causing the image degradation.

This embodiment sets an imaging magnification ratio of the image-pickup optical apparatus to ×40, but the present invention is not limited to this embodiment. For example, the present invention may also be applied to a reduction optical system. In the image pickup in the typical camera, the image-pickup optical apparatus is the reduction optical system and the illumination optical system is an incoherent system. In other words, the present invention may also be applied to the photography using the typical camera.

While this embodiment assumes no aberration, the present invention is not limited to this embodiment.

While this embodiment provides no image processing such as an image stabilization for the obtained image, such an image processing may also be performed.

Second Embodiment

A description will now be given of a denoising method according to a second embodiment of the present invention. The second embodiment assumes a confocal optical system used to observe fluorescent light.

Figure 17:
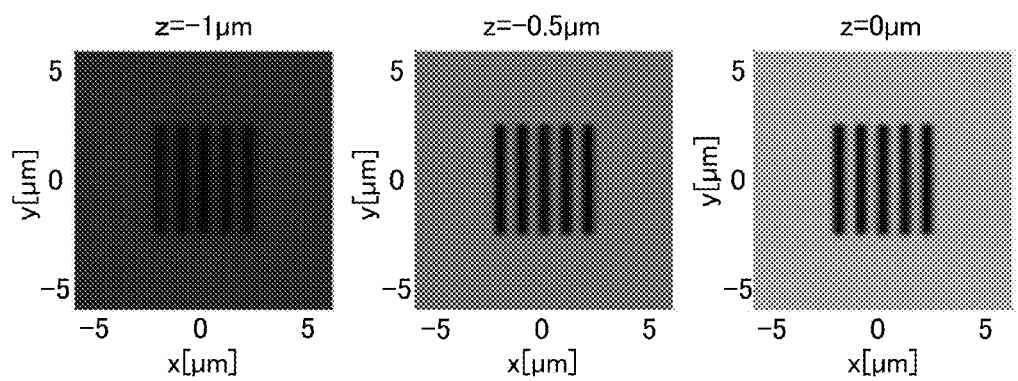
FIG. 17 is a diagram illustrating an object image obtained by changing a position in the optical axis direction according to the second embodiment.

An object image obtained according to the flowchart of FIG. 2B is illustrated through simulation. Assume that the object-side numerical aperture of an image-pickup optical system is 0.7, a wavelength of monochromatic illumination light is 550 nm, a wavelength of monochromatic fluorescent light from an object is 550 nm, and a sampling pitch in the x-direction and y-direction is 100 nm on the object. FIG. 7 illustrates a distribution of a light emission efficiency of the object. A two-dimensional object is assumed for calculation purposes. This method is applicable to an object that has a thickness. A brightness distribution of the image was computed by changing the position of the optical axis direction by 0.25 μm from −4.0 μm to 4.0 μm. FIG. 17 illustrates illustrative images obtained by changing the position in the optical axis direction. The axis of the image indicates a value on the object plane.

Figure 18:
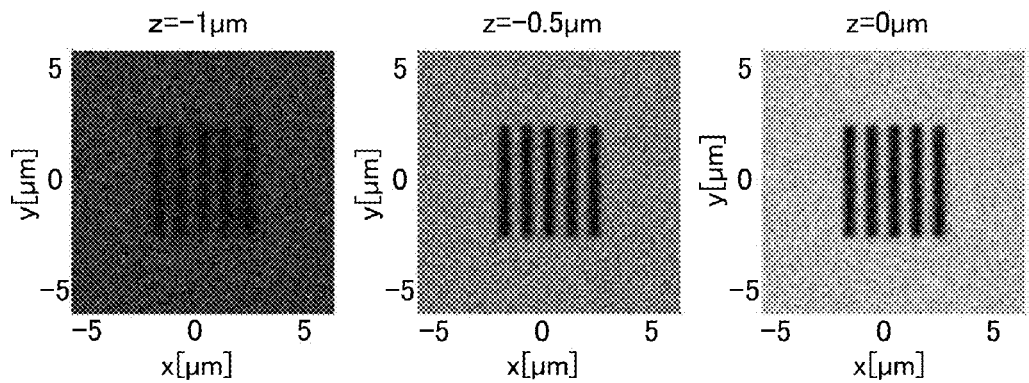
FIG. 18 is a diagram illustrating an image obtained by adding a noise to the image of FIG. 17 according to the second embodiment.

A 10% Gaussian noise is assumed for the image. FIG. 18 illustrates an illustrative post-noised image. When FIG. 18 is compared with FIG. 17, it is understood that the entire image is noised.

A denoising method will be described.

I(x, y, z) denotes a brightness distribution of the image at a position z. A three-dimensional discrete Fourier transform is performed for x, y, and z of I(x, y, z) to obtain I'($f_x$, $f_y$, $f_z$). A low-pass filter is applied in which the region satisfying the expressions 17 and 18 is non-zero. The present invention is not limited to this filter.

Figure 19:
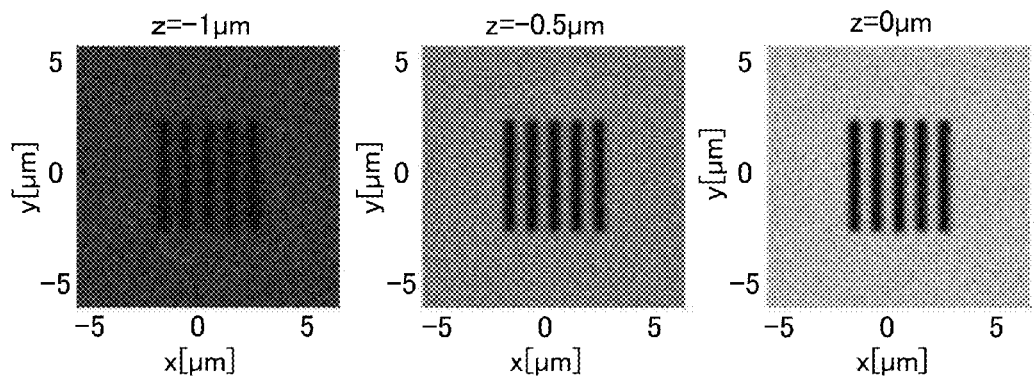
FIG. 19 is a diagram illustrating a filtered image according to the second embodiment of the present invention.
Figure 20:
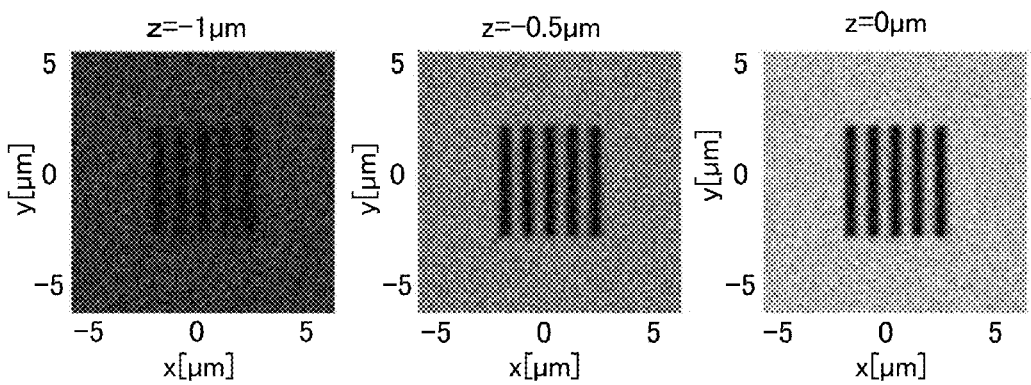
FIG. 20 is a diagram illustrating a filtered image according to the prior art.

FIG. 19 illustrates an illustrative filtered image. When FIG. 19 is compared with FIG. 18, it is understood that more noise are reduced. FIG. 20 illustrates an illustrative image obtained by the conventional method. Since the prior art applies a low-pass filtering to each image, it uses the filter in which the region satisfying the expression 17 is set to non-zero. When FIGS. 19 and 20 are compared with each other, it is understood that more noises are reduced in FIG. 19 and this embodiment has a higher denoising effect.

Figure 21:
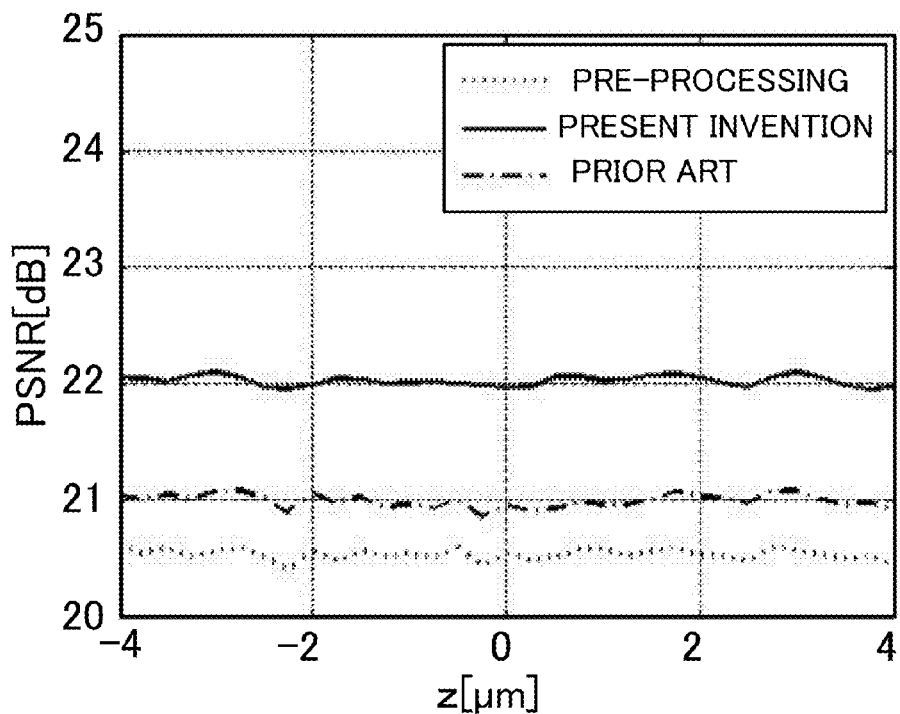
FIG. 21 is a graph illustrating the PSNR for a position z in the optical axis direction according to the second embodiment.

In order to quantifying the difference of the image, the PSNR is calculated based on the pre-noised image. FIG. 21 illustrates the position z and the PSNR. A dotted line corresponds to the PSNR of the post-noised image. An alternate long and short dash line corresponds to the PSNR of a denoised image according to the prior art method. A solid line corresponds to the PSNR of the denoised image by the method according to the present invention. The value of the solid line is higher than a value of any of the lines or that of the alternate long and short dash line. This means that the noise reduction effect of this embodiment higher than that of the prior art.

Figure 22:
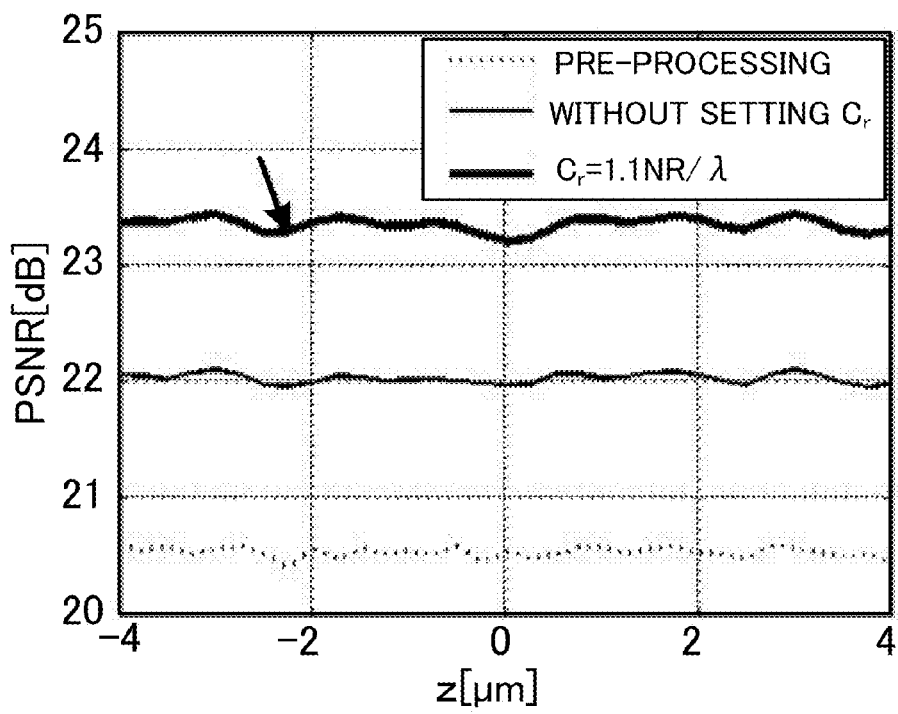
FIG. 22 is a graph illustrating the PSNR for a position z in the optical axis direction according to the second embodiment.

The diffracted light distribution of natural light generally has a smaller value as the spatial frequency increases. Hence, a spectral component having a high spatial frequency may have a smaller value than a signal caused by the noise. Therefore, the denoising effect can be improved by using the low-pass filter having a narrower region than that of the filter defined in the expressions 17 and 18. For example, a result with a filter in which the region satisfying the expressions 24 and 25 with $C_r=1.1NA/\lambda$ and $C_z=NA^2/\lambda$ is set to non-zero. FIG. 22 illustrates the PSNR of a denoised image. A bold line corresponds to a filter obtained with $Cr=1.1NA/\lambda$, in which an arrow is indicated for easy understanding. It is understood that the denoising effect is higher than the above result.

Since a diffracted light component caused by the object also decreases, the image also deteriorates. It is necessary to determine the level of reducing the filter within a user's permissible range based upon the processed image.

This embodiment uses a line chart having a width of 0.5 μm for an object, but the present invention is not limited to this object. For example, a tissue of a biological body, a substrate of a semiconductor, a landscape, or a person may also be used.

Although this embodiment assumes a confocal optical system so as to observe fluorescent light, denoising is similarly available for a confocal optical system used to observe reflected light or transmitting light.

Third Embodiment

A description will now be given of operations in obtaining a denoised image with network devices 460, 462, 464, and 466 (represented by "460" hereinafter) connected to the image processing apparatus via a network 450. A user may request for a transmission of the denoised image data stored in a server (not illustrated). Alternatively, a user may request for a transmission of denoised image data at a predetermined position by designating N image data including the image data at a predetermined position, such as an in-focus position or a defocus position, stored in the server (not illustrated). Alternatively, a user may request for a transmission of denoised image data by transmitting N image data including image data at a predetermined position.

First, a user accesses an image processing apparatus or a server (not illustrated) via the network 450 by operating the network device 460. A storage device (not illustrated) is connected to the server (not illustrated). In this case, the image processing apparatus does not store image data, and the image data to be processed is stored in the storage device. The image processing apparatus obtains the image data to be processed from the storage device. When the network device 460 accesses the image processing apparatus, the storage device that stores the image data to be processed is connected to the image processing apparatus directly or via a network such as a LAN. The following description assumes that the network device 460 accesses the information processing unit 400 as the image processing apparatus.

As the network device 460 accesses the information processing unit 400, a user is urged to input a user name and a password for authentication.

An authenticated user, such as a doctor accesses information about a patient stored in the data storage device 403, for example, by inputting the ID of the patient. Assume that the data storage device 403 stores N image data for the object (patient) captured (obtained) at N different positions $z_j$ (where and N is an integer equal to or greater than 2) in the optical axis direction of the image-pickup optical system using the image-pickup optical apparatus that includes the image-pickup optical system. The user selects one of thumbnails or filenames of the N image data as target image data to be denoised. Then, the user clicks a denoising button. In response, the computer 401 and the image processor 402 provide the above denoising (image processing).

Then, a user selects a menu for reading this image on the network, a menu for downloading and storing the image, or a menu for selecting another image. As a result, a user can obtain denoised image data.

The image processing method according to the present invention is applicable to a digital microscope or a digital camera.

The present invention can provide an image processing method, a program, an image processing apparatus, an image-pickup optical apparatus, and a network device, configured to effectively reducing noises generated randomly in a low frequency region from an image obtained by an image sensor.

While the present invention has been described with reference to exemplary embodiments, it is to be understood that the present invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-245701, filed Nov. 7, 2012 which is hereby incorporated by reference herein in its entirety.

What is claimed is:

1. An image processing method configured to denoise three-dimensional image data of an object captured at a plurality of different positions in an optical axis direction of an image-pickup optical system, the image processing method comprising:
 an image transform step of performing a frequency transform for the three-dimensional image data in the optical axis direction and of calculating three-dimensional transformed image data;
 an image modulation step of reducing an absolute value of the three-dimensional transformed image data in a specific frequency region and of calculating three-dimensional modulated image data; and
 an inverse image transform step of performing an inverse frequency transform corresponding to the frequency transform for the three-dimensional modulated image data in the optical axis direction and of calculating three-dimensional inversely transformed image data,
 wherein the specific frequency region is a part of a region expressed by the following conditional expression:

$$|f_z| > 0.01 NA^2/\lambda,$$

where $f_z$ is a spatial frequency in the optical axis direction, NA is the object-side numerical aperture of the image-pickup optical system, and λ is a wavelength of light from the object.

2. The image processing method according to claim 1, wherein the frequency transform is a Fourier transform.

3. The image processing method according to claim 2, wherein the specific frequency region is a part of a region expressed by the following conditional expression:

$$|f_z| > \frac{NA^2}{2\lambda}.$$

4. The image processing method according to claim 2, wherein the specific frequency region is a part of a region expressed by the following conditional expression:

$$|f_z| > \frac{2(1 - \sqrt{1 - NA^2})}{\lambda}.$$

5. The image processing method according to claim 1, wherein the frequency transform is a cosine transform.

6. The image processing method according to claim 5, wherein the specific frequency region is expressed by the following conditional expression:

$$|f_z| > \frac{NA^2}{\lambda}.$$

7. The image processing method according to claim 5, wherein the specific frequency region is expressed by the following conditional expression:

$$|f_z| > \frac{4(1 - \sqrt{1 - NA^2})}{\lambda}.$$

8. An image processing method configured to denoise three-dimensional image data of an object captured at a plurality of different positions in an optical axis direction of an image-pickup optical system, the image processing method comprising:
 an image transform step of performing a frequency transform for the three-dimensional image data in the optical axis direction and two directions orthogonal to the optical axis direction and of calculating three-dimensional transformed image data;
 an image modulation step of reducing an absolute value of the three-dimensional transformed image data in a specific frequency region and of calculating three-dimensional modulated image data; and
 an inverse image transform step of performing an inverse frequency transform corresponding to the frequency transform for the three-dimensional modulated image data in the optical axis direction and the two directions and of calculating three-dimensional inversely transformed image data,
 wherein the specific frequency region is a part of a region expressed by at least one of the following three conditional expressions:

$$NA^2 - \left(\frac{|f_z|}{f_r} + \frac{\lambda f_r}{2}\right)^2 < 0,$$

$$|f_r| > 0.01\ NA/\lambda,$$

and $$|f_z| > 0.01\ NA^2/\lambda,$$

where $f_z$ is a spatial frequency of the optical axis direction, $f_r$ is a spatial frequency of a direction perpendicular to the optical axis direction of the image-pickup optical system, NA is the object-side numerical aperture of the image-pickup optical system, and λ is a wavelength of light from the object.

9. The image processing method according to claim 8, wherein the specific frequency region is a part of a region expressed by the following conditional expression:

$$|f_z| > 0.5 NA^2/\lambda.$$

10. The image processing method according to claim 8, wherein the specific frequency region is a part of a region expressed by the following conditional expression:

$$|f_r| > 0.9 NA/\lambda.$$

11. The image processing method according to claim 8, wherein the frequency transform is a Fourier transform.

12. The image processing method according to claim 11, wherein the specific frequency region is expressed by at least one of the following two conditional expressions:

$$|f_z| > \frac{2(1 - \sqrt{1 - NA^2})}{\lambda}$$

$$|f_r| > \frac{4\ NA}{\lambda}.$$

13. The image processing method according to claim 8, wherein the frequency transform is a cosine transform.

14. The image processing method according to claim 13, wherein the specific frequency region is a part of a region expressed by at least one of the following three conditional expressions:

$$NA^2 - \left(\frac{|f_z|}{f_r} + \frac{\lambda f_r}{4}\right)^2 < 0,$$

$$|f_r| > 0.02\ NA/\lambda,$$

and $$|f_z| > 0.02\ NA^2/\lambda.$$

15. The image processing method according to claim 13, wherein the specific frequency region is a part of a region expressed by at least one of the following two conditional expressions:

$$|f_z| > \frac{4(1 - \sqrt{1 - NA^2})}{\lambda}$$

$$|f_r| > \frac{8\ NA}{\lambda}.$$

16. The image processing method according to claim 1, wherein the following conditional expression is satisfied:

$$|\Delta z| \leq \frac{\lambda}{NA^2},$$

wherein $\Delta z$ is a distance between adjacent two of the plurality of the different positions in the optical axis direction.

17. The image processing method according to claim 1, wherein the image modulation step sets a value of the three-dimensional transformed image data in the specific frequency region to zero.

18. A non-transitory tangible computer readable medium configured to store a program that enables a computer to execute an image processing method configured to denoise three-dimensional image data of an object captured at a plurality of different positions in an optical axis direction of an image-pickup optical system the image processing method comprising:

an image transform step of performing a frequency transform for the three-dimensional image data in the optical axis direction and of calculating three-dimensional transformed image data;

an image modulation step of reducing an absolute value of the three-dimensional transformed image data in a specific frequency region and of calculating three-dimensional modulated image data; and an inverse image transform step of performing an inverse frequency transform corresponding to the frequency transform for the three-dimensional modulated image data in the optical axis direction and of calculating three-dimensional inversely transformed image data, wherein the specific frequency region is a part of a region expressed by the following conditional expression:

$|f_z| > 0.01 NA^2/\lambda,$ where $f_z$ is a spatial frequency in the optical axis direction, NA is the object-side numerical aperture of the image-pickup optical system, and $\lambda$ is a wavelength of light from the object.

19. An image-pickup optical apparatus comprising an operating unit configured to execute an image processing method configured to denoise three-dimensional image data of an object captured at a plurality of different positions in an optical axis direction of an image-pickup optical system the image processing method comprising:

an image transform step of performing a frequency transform for the three-dimensional image data in the optical axis direction and of calculating three-dimensional transformed image data;

an image modulation step of reducing an absolute value of the three-dimensional transformed image data in a specific frequency region and of calculating three-dimensional modulated image data; and an inverse image transform step of performing an inverse frequency transform corresponding to the frequency transform for the three-dimensional modulated image data in the optical axis direction and of calculating three-dimensional inversely transformed image data, wherein the specific frequency region is a part of a region expressed by the following conditional expression:

$|f_z| > 0.01 NA^2/\lambda,$ where $f_z$ is a spatial frequency in the optical axis direction, NA is the object-side numerical aperture of the image-pickup optical system, and $\lambda$ is a wavelength of light from the object.

20. The image-pickup optical apparatus according to claim 19, wherein the image-pickup optical apparatus is a microscope.

21. The image-pickup optical apparatus according to claim 19, wherein the image-pickup optical apparatus is a camera.

22. The image-pickup optical apparatus according to claim 19, wherein image data is obtained in a wavelength range of 300 to 1500 nm, and wherein the image-pickup optical apparatus further comprises an illumination unit configured to illuminate the object with light having the wavelength range of 300 to 1500 nm.

23. The image-pickup optical apparatus according to claim 19, further comprising an illumination optical system configured to illuminate the object with partially coherent light.

24. An image processing apparatus comprising an operating unit configured to executes execute an image processing method configured to denoise three-dimensional image data of an object captured at a plurality of different positions in an optical axis direction of an image-pickup optical system the image processing method comprising:

an image transform step of performing a frequency transform for the three-dimensional image data in the optical axis direction and of calculating three-dimensional transformed image data;

an image modulation step of reducing an absolute value of the three-dimensional transformed image data in a specific frequency region and of calculating three-dimensional modulated image data; and an inverse image transform step of performing an inverse frequency transform corresponding to the frequency transform for the three-dimensional modulated image data in the optical axis direction and of calculating three-dimensional inversely transformed image data, wherein the specific frequency region is a part of a region expressed by the following conditional expression:

$|f_z| > 0.01 NA^2/\lambda,$ where $f_z$ is a spatial frequency in the optical axis direction, NA is the object-side numerical aperture of the image-pickup optical system, and $\lambda$ is a wavelength of light from the object.

25. A network device connected to the image processing apparatus according to claim 24 via a network, comprising:
- a designator configured to designate a position for processing image data of an object using the image processing apparatus; and
- a communication unit configured to transmit information about the position to the image processing apparatus and receives information about the image data processed by the image processing apparatus.

\* \* \* \* \*